Dec. 13, 1949  L. S. HARBER  2,491,177
MEANS FOR DELIVERING FLOUR OR
OTHER POWDERED MATERIAL

Filed Dec. 15, 1944  2 Sheets-Sheet 1

Inventor
L. S. Harber
By Glascock Downing Seebold
Attys

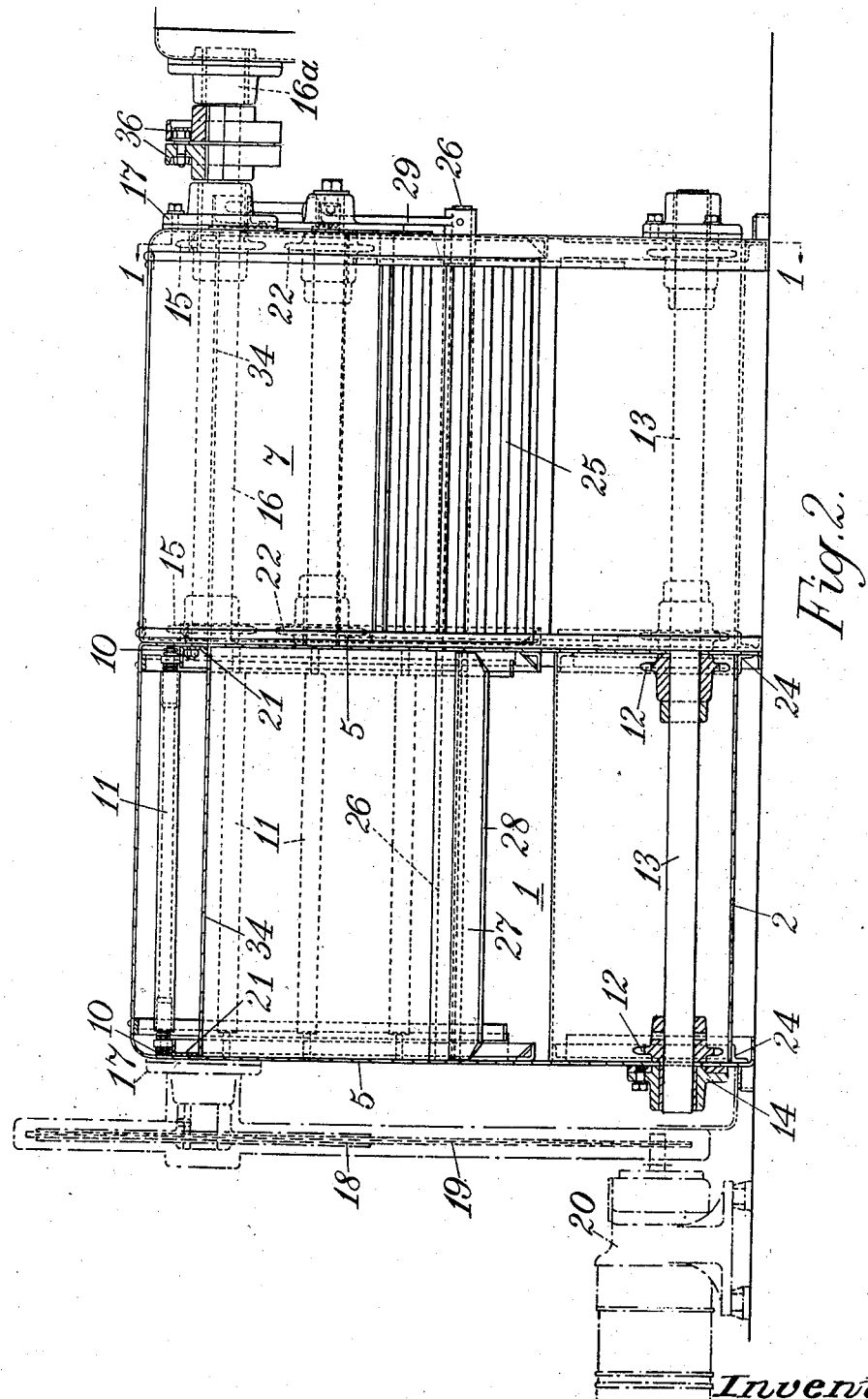

Patented Dec. 13, 1949

2,491,177

UNITED STATES PATENT OFFICE 2,491,177

MEANS FOR DELIVERING FLOUR OR OTHER POWDERED MATERIAL

Laurence Seymour Harber, Peterborough, England

Application December 15, 1944, Serial No. 568,383
In Great Britain December 17, 1943

7 Claims. (Cl. 222—290)

This invention relates to apparatus or means for delivering flour or various grades of flour or other powdered material (hereinafter referred to as flour) at an adjustable rate from a bulk supply or supplies or storage, the invention being especially suitable as applied to apparatus known in the bakery trade as flour proportioners, which are required to dispense various grades of flour from time to time at a regulable rate, so that the final bulk of mixed grades will give the desired blend of flour.

Hitherto apparatus for carrying out the above requirements generally consisted of a number of bins or receptacles for containing the bulk of the flours being placed through holes in the floor of the building, in order that a sack of flour could easily be tipped into the bins, without the operator having to lift the sack. Among other disadvantages was the necessity for having to provide holes in the floor of considerable size. In addition, two or more bins such as required, would have to be disposed in the flour room so that the operator could get around them in order to feed the flour from the sack. Thus a considerable amount of valuable floor space would be taken up.

The present invention overcomes these serious disadvantages as by its aid the bins may be arranged on one floor without any necessity for holes in floors. In addition, two or more bins can conveniently be placed in a corner of the flour room, thus taking up much less floor space than hitherto. The bins in the present invention are a new type with a relatively large area arranged with a conveniently low height for feeding from the sacks. Another advantage is that when commencing with two or more bins as an apparatus, more bins may be added quite easily as time and circumstances require, and without unduly using up floor space.

The invention consists in apparatus of the kind indicated comprising a bin adapted to contain a bulk supply of flour having an appropriately located charging entry and an outlet aperture located in the bottom and towards one end of the bin, an endless chain conveyor having longitudinally spaced pusher rods disposed transversely between the chains, a lap of which extends over the bottom of the bin and is adapted to advance the flour towards the outlet, and an adjustable division blade adapted to regulate the thickness of the layer of the powdered material separated from the bulk and delivered by the conveyor to the outlet aperture.

The invention also consists in apparatus as indicated in the preceding paragraph and having a curved baffle at the outlet end of the bin adapted to re-direct the bulk of the flour travelling towards that end of the bin and maintain it in circulation.

In the preferred form the diameter of the pusher rods and the spacing thereof are such that during the operation of the conveyor, there is a constant movement of the flour towards the outlet end of the apparatus, while when the outlet is closed, the conveyor slips through the bulk of the flour carrying only the flour lying between the rods or a layer not substantially thicker than the diameter of the rods.

In the accompanying drawings:

Figure 2 shows a pair of bins coupled together, the left hand bin being a section on 2—2 of Figure 1, the right hand bin being a front elevation.

Figure 1:
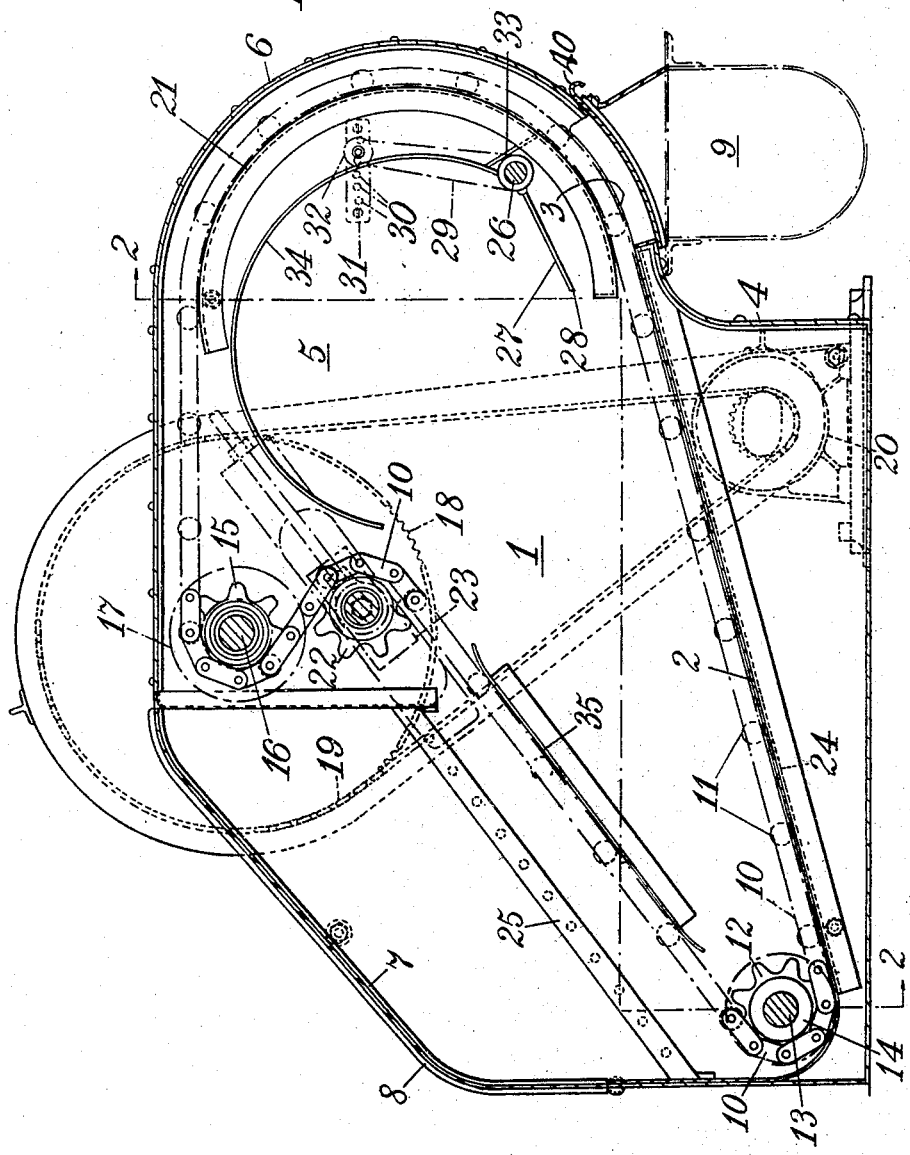
Figure 1 is a sectional elevation on 1—1 of Figure 2.

In carrying the invention into effect according to one convenient mode as described, by way of example, as applied to a flour proportioner, a bin or container 1 of appropriate capacity is provided and is formed with a rectilinear bottom 2 which is conveniently arranged at a slight upward incline towards the delivery station 3 by mounting the bin on legs or extensions 4 of the side walls 5 so that it is tipped upwardly. Over the delivery station the bottom of the bin is provided with an outlet aperture 3 having a closure or door 40. The wall 6 of the bin beyond the outlet is of semi-cylindrical or like curved form. The upper part of the bin towards the feed end thereof is provided with a low charging entry or opening 7 over which a cover plate 8 may be fitted.

The outlet 3 may be provided with a spout or short chute for delivery of the flour to a receptacle or the outlet may discharge into a conveyor trough 9 having an Archimedean screw or other conveyor.

Within the conveyor and adjacent the side walls 5 thereof a pair of endless chains 10 are located. These chains 10 have an appropriate series of transverse pusher rods or tubes 11 extending between them. The diameter of the rods 11 is substantially equal to the depth of the chains 10. At the feed end of the bin and adjacent the bottom thereof a pair of chain wheels 12 is mounted for guiding the chains in their paths. The chain wheels 12 are mounted on a shaft 13 located in bearings 14 in the side walls 5. Adjacent the upper end of the charging opening 7 a second pair of chain wheels 15 is mounted upon a transverse shaft 16 mounted in bearings 17 in the side walls. This latter pair of chain wheels 15 is adapted to transmit the drive to the conveyor chains 10 for which purpose the shaft 16 passes through the side wall of the bin and carries a large-diameter chain wheel 18 driven by a chain 19 from a motor 20 which if desired may be located beneath the bin.

Near the curved or semi-circular wall 6 of the bin, side tracks 21 of corresponding curvature are provided for the chains 10 so that they are guided by the tracks 21 on a path parallel to the curved wall from whence they pass to the driving chain wheels 15. Below the driving chain wheels a pair of jockey chain wheels 22 are mounted in adjustable sliders 23 for applying tension to the chain in the known manner. From the jockey chain wheels 22 the chain passes around the guiding chain wheels 12 at the front end of the bottom of the bin, and from the last-mentioned chain wheels to the curved tracks 21 the chains travel adjacent the bottom 2 of the bin upon tracks 24 and over the outlet aperture.

Flour introduced is fed in the charging opening and is dumped through a grid 25 on to the bottom of the bin and the lap of the conveyor lying parallel thereto, through spaces between the pusher rods 11 of that part of the conveyor between the jockey and guiding chain wheels 22 and 12. The diameter of the pusher rods 11 and the longitudinal spacing thereof are arranged so that when the conveyor is travelling and the outlet 3 is open the bulk of the flour is carried forward toward the open outlet 3 and curved end 6 of the bin substantially en masse, while when the outlet 3 is closed the conveyor slips through the lowermost zone of flour and carries forward flour lying between the rods or a layer not substantially thicker than the diameter of the rods 11 while a relatively slight forward impetus is transmitted to the bulk of the flour. Thus for example, the rods 11 may be of 1" diameter and spaced from one another at 6" pitch.

Within the conveyor path (as viewed in side elevation) and over the outlet or further side of the outlet 3, a transverse shaft 26 supported in bearings in the side walls of the bin carries a dividing blade or plate 27 the free end 28 of which extends in the direction from which the lower lap of the conveyor is travelling. The blade shaft at one end extends through a side wall of the bin and has fixed upon it an adjustment lever 29 carrying a handle 32 which is provided with an axially displaceable pin for engaging in one or other of a series of bores 30, which may be numbered, in a plate 31 carried on the adjacent bin wall.

By operation of the handle 32 it will be appreciated that the angle of the blade 27 can be altered at will so that the spacing of the free end 28 thereof with respect to the bottom of the bin may be adjusted to vary the depth of the flour layer which may pass under the blade 27 to the outlet 3. Thus the quantity of delivery may be adjusted as may be required.

At the rear of the blade shaft 26 and upon the farther side of the outlet a blocking or strickler plate 33 extends across the bin to cut back any flour that may tend to be carried up between the back of the adjustable blade 27 and the curved track of the conveyor. This plate 33 adjoins a curved plate 34 which extends more or less parallel with the curved wall 6 of the bin and in front of the curved chain path and is preferably continued in an arc to direct flour pressed against it over and back towards the feed end of the bin.

Between the guiding sprockets 12 and the jockey sprockets 22 supporting side tracks 35 are provided for the chains.

The apparatus may be built as a single bin or bins may be provided with two compartments separated by a partition, or as shown in Figure 2, two separate bins 1 and 1a may be bolted together to form a pair, the driving and guiding chain wheels 12 and 15 of both bins being common to the shafts 13 and 16 which extend through both bins and which are positioned when uniting a pair of bins together. A series of pairs of bins may also be coupled together side by side to form a battery, in which case the driving shafts 16, 16a of the respective pairs are connected together by bolted flanges 36 or by dog or flexible couplings.

A single delivery conveyor trough 9 may serve all the bins or one pair of bins may deliver to a conveyor trough adapted to deliver in one direction while a second pair may deliver to a conveyor though adapted to deliver in the opposite direction.

I claim:

1. Means for delivering flour comprising a container adapted to contain a bulk supply of flour, said container having a charging entry and a bottom wall including an outlet aperture closure means for the aperture, endless conveyor means located wholly within the container and having longitudinally spaced pusher elements, said conveyor comprising a lower conveying lap extending over said bottom wall and across said outlet aperture and operative to advance the flour towards the outlet, an adjustable division blade located within the container for regulating the thickness of the layer of flour separated from the bulk and delivered by the conveyor to said outlet, and baffle means located adjacent the outlet to redirect the bulk of flour travelling toward the outlet and maintain it in circulation.

2. Means for delivering flour as claimed in claim 1, wherein the baffle means comprises a curved plate one end of which is located adjacent the outlet.

3. Means for delivering flour as claimed in claim 2, wherein the conveyor comprises endless side chains to which said pusher elements are secured, said elements comprising rods of circular cross section, the diameter of said rods being substantially equal to the depth of the chains such that during operation with the outlet open there is a constant flow of flour towards the outlet, while when the outlet is closed, the conveyor slips through the bulk of flour carrying only the flour lying between the rods.

4. Means for delivering flour as claimed in claim 1, wherein said bottom wall is inclined upwardly towards said outlet, the conveying lap of the conveyor conforming to such inclination.

5. Means for delivering flour as claimed in claim 1, wherein said bottom wall is inclined upwardly towards said outlet, the conveying lap of the conveyor conforming to such inclination and wherein the conveyor after passing beyond said outlet moves through an upwardly curved path around guide means between the baffle means and the container wall and then returns to the conveying lap.

6. Means for delivering flour comprising a pair of containers bolted together side by side, each container having a charging entry and a bottom wall including an outlet aperture having closure means, separate endless conveyor means for each container and located wholly within said containers each, said conveyor means having longitudinally spaced pushers and comprising a lower conveying lap extending over the bottom wall and across the outlet aperture and operative to advance the flour towards the outlet, said conveyors passing around driving and guide wheels located on shafts common to both containers and extending through said containers, an adjustable division means for each container for regulating the thickness of the layer of flour separated from the bulk and delivered by the conveyor to the outlet, and baffle means located adjacent each outlet for directing the bulk of flour travelling toward the outlet and maintain it in circulation.

7. Means for delivering flour as claimed in claim 1, wherein the baffle means comprises a curved plate one end of which is located adjacent the outlet, and the adjustable division blade is pivoted adjacent said end and has a free edge extending in the direction from which the conveying lap travels.

LAURENCE SEYMOUR HARBER.

REFERENCES CITED

The following references are of record in the file of this patent:

UNITED STATES PATENTS

| Number | Name | Date |
|---|---|---|
| 39,122 | Cox | July 7, 1863 |
| 615,748 | Richner | Dec. 13, 1898 |
| 1,134,688 | McWhorter | Apr. 6, 1915 |
| 1,364,168 | Willford | Jan. 4, 1921 |
| 1,752,549 | Beardsley et al. | Apr. 1, 1930 |
| 1,927,318 | McEntee et al. | Sept. 19, 1933 |
| 1,977,513 | Holbeck | Oct. 16, 1934 |
| 2,392,231 | Cooper | Jan. 1, 1946 |